(12) United States Patent
Redfern

(10) Patent No.: US 6,999,508 B1
(45) Date of Patent: Feb. 14, 2006

(54) MULTI-CHANNEL FREQUENCY DOMAIN EQUALIZER FOR RADIO FREQUENCY INTERFERENCE CANCELLATION

(75) Inventor: Arthur J. Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 651 days.

(21) Appl. No.: 09/707,874

(22) Filed: Nov. 7, 2000

(51) Int. Cl.
H03H 7/30 (2006.01)
H03D 1/04 (2006.01)

(52) U.S. Cl. ................ 375/229; 375/232; 375/346
(58) Field of Classification Search ............... 375/222, 375/229, 230, 232, 316, 346, 350, 147
See application file for complete search history.

(56) References Cited

U.S. PATENT DOCUMENTS

| 5,901,180 | A | * | 5/1999 | Aslanis et al. | 375/261 |
| 6,005,893 | A | * | 12/1999 | Hyll | 375/260 |
| 6,047,025 | A | * | 4/2000 | Johnson et al. | 375/232 |
| 6,097,763 | A | * | 8/2000 | Djokovic et al. | 375/260 |

FOREIGN PATENT DOCUMENTS

WO WO 98/10555 A2 3/1998

OTHER PUBLICATIONS

Per tone equalization for DMT receivers □□Van Acker, K; Leus, G.; Moonen, M.; van de Wiel, O.; Pollet, T.; □□Global Telecommunications Conference, 1999. GLOBECOM '99, vol.: 5 , 1999 □□Page(s): 2311-2315 vol. 5.*
Ammari, Mohamed L., et al., "Performance of Sub-Carrier Synchronized OFDM," Vehicular Technology Conference Proceedings, Tokyo, Japan, May 15-18, 2000, IEEE Vehicular Technology Conference, New York, NY, vol. 1, Conf. 51, May 15, 2000, pp. 225-229, XP000970613.

* cited by examiner

*Primary Examiner*—Chieh M. Fan
*Assistant Examiner*—Jason M. Perilla
(74) *Attorney, Agent, or Firm*—Frederick J. Telecky, Jr.; W. James Brady, III

(57) ABSTRACT

A multichannel frequency domain equalizer improves the subchannel signal to noise ratio by canceling correlated noise that is caused by deterministic spreading at the receiver that introduces correlation into the subchannel noise vector.

5 Claims, 3 Drawing Sheets

MULTI-CHANNEL FREQUENCY DOMAIN EQUALIZER FOR RADIO FREQUENCY INTERFERENCE CANCELLATION

BACKGROUND OF THE INVENTION

1. Field of the Invention

This invention relates generally to radio frequency interference impairments associated with digital subscriber lines, and more particularly to a method for exploiting deterministic spreading of the fast Fourier transform (FFT) at the receiver to cancel correlated noise sources such as RFI.

2. Description of the Prior Art

ITU Telecommunications Standardization Sector, *G.test.bis.*, Study Group 4, Question 15, 1999, has proposed various radio frequency interference (RFI) impairments for incorporation into digital subscriber line (DSL) performance tests. For asymmetric DSL (ADSL) systems such as described in ITU Telecommunications Standardization Sector, *G. 992.1: Asymmetrical Digital Subscriber Line (ADSL) Transceivers.*, Study Group 4, Question 15, 2000, RFI is assumed to be caused by narrowband amplitude modulated (AM) radio stations, which overlap the downstream ADSL band from 540–1104 kHz. Additional RFI sources include, but are not limited to, aliases from AM stations operating above 1104 kHz, amateur (HAM) transmitters, televisions, computer equipment, and various other (relatively) low frequency signals (e.g., aeronautical radiolocation signals).

At the ADSL transmitter, data is assembled into subchannels, transformed by an inverse fast Fourier transform (IFFT), and a cyclic prefix is added. After propagating through a communication channel, the opposite operations are performed by the receiver. The cyclic prefix is removed, and the received data is transformed by the fast Fourier transform (FFT). If the communication channel is shorter than the cyclic prefix and the noise is uncorrelated on the individual subchannels, then the transmitted data can be recovered by a one-tap equalizer (the frequency-domain equalizer or FEQ), such as described by T. Starr, J. Cioffi and P. Silverman, *Understanding Digital Subscriber Line Technology*, Upper Saddle River, N.J.: Prentice Hall, 1999.

The noise that results from RFI at the receiver is deterministically spread by the FFT to neighboring subchannels. As a result, instead of one (or a few) subchannels being effected by the narrowband impairment, many subchannels are effected. The resulting loss of signal-to-noise ratio (SNR) can unacceptably limit the capacity of the communication channel.

In view of the foregoing, a need exists for a scheme to exploit the deterministic spreading of the FFT at the receiver to cancel correlated noise sources such as RFI in order to increase the effective data communication rate between subscribers using shared media.

SUMMARY OF THE INVENTION

The present invention is directed to a method of estimating the multichannel FEQ in block and iterative fashions. Specifically, algorithms are developed to estimate the multichannel FEQ. The estimated multichannel FEQ provides improvements in SNR over that achievable using standard single channel FEQ.

According to one embodiment, a multichannel FEQ is formulated when there is correlation in the noise matrix (e.g., from a correlated noise source such as RFI). Equalizers which have nonzero elements in addition to the main diagonal are considered. Each row of the multichannel FEQ is recovered via choosing the nonzero columns in addition to the column directly correlated with the input through the channel. Columns corresponding to subchannels having strong correlations with the column directly correlated with the input through the channel are most preferably chosen (generally neighboring subchannels, or subchannels corresponding to strong RFI sources). As the RFI and signal power become closer, not transmitting data on a subchannel allows that subchannel to be used more effectively with other subchannels in the multichannel FEQ.

As used herein, FEQ means a complex multiply to adjust for the gain and phase of the effective channel response in each sub-symbol. The FEQ does not enhance the SNR; it only scales and rotates each sub-symbol so that a common decoder can be used.

As used herein the following notation will have the following meanings. Italics will be used for scalars, and boldface for vectors and matrices. A superscript $^-$ will refer to the pseudoinverse, $*$ to conjugation, $^T$ to transpose, and $^H$ to conjugate transpose. The operator diag( ) forms a diagonal matrix with the arguments being the elements of the main diagonal, wherein E[ ] is the expected value of its argument, and $\lambda_{max}($ ) is the maximum eigenvalue of its argument. The term a:b will be used to denote a contiguous subset of a vector or dimension of a matrix, and a ":" by itself refers to all of the elements along that dimension. For example, if $$c=[c(1) \ldots c(L)]^T,$$

then, $$c(:)=c, \text{ and}$$

$$c(a:b)=[c(a) \ldots c(b)]^T.$$

To select a (possibly) noncontiguous subset of a vector or dimension of a matrix, a vector of the desired indices will be used as the argument of that dimension. For example, if $$k=[k(1) \ldots k(M)]^T$$

is a vector of integers, then $$c(k)=[c(k(1)) \ldots C(k(M))]^T.$$

BRIEF DESCRIPTION OF THE DRAWINGS

Other aspects and features of the present invention, and many of the attendant advantages of the present invention, will be readily appreciated as the same become better understood by reference to the following detailed description when considered in connection with the accompanying drawing wherein.

Figure 1:
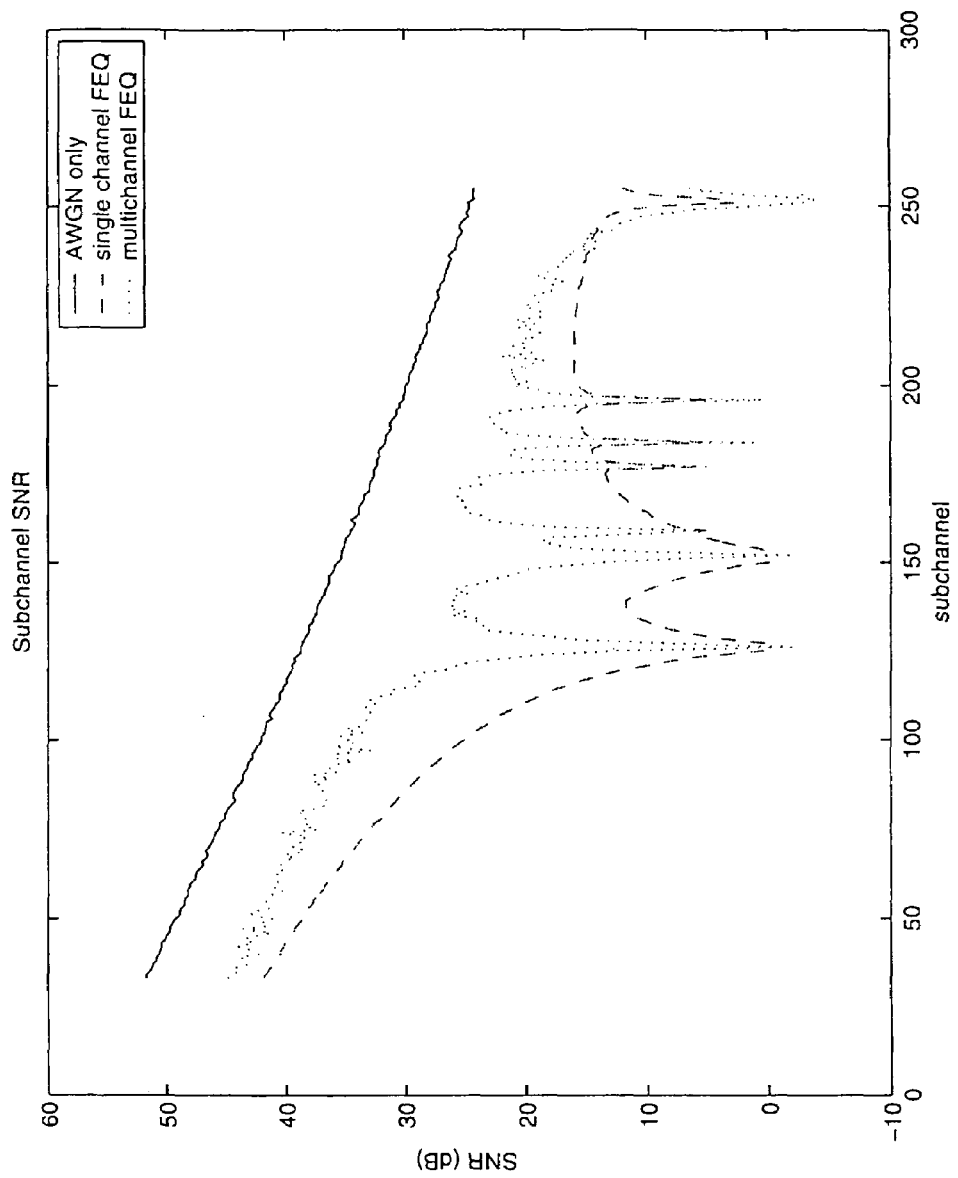
FIG. 1 is a graph illustrating a simulated subchannel SNR for additive white Gaussian noise (AWGN) with no RFI, AWGN with RFI using single channel FEQ, and AWGN with RFI using multichannel FEQ in accordance with one embodiment of the present invention.

While the above-identified drawing figures exemplify characteristics associated with particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The present invention is best understood by considering a system with $n=1, \ldots, N$ subchannels which transmits data at time $t=1, \ldots, T$. If subchannels are arranged along the rows and times are arranged along the columns, then a $N \times T$ transmitted data matrix X can be written as $$X = \begin{bmatrix} X(1,1) & \cdots & X(1,T) \\ \vdots & & \vdots \\ X(N,1) & \cdots & X(N,T) \end{bmatrix} \quad (1)$$

Y, a $N \times T$ matrix of received symbols, and V, a $N \times T$ noise matrix, are defined in an analogous manner.

In order to implement one embodiment of the present invention, the present inventor designed a $N \times N$ equalizer, G, such that $$G(n,:) = \underset{G(n,:)}{\operatorname{argmin}} E[|X(n,t) - G(n,:)Y(:,t)|^2] \quad (2)$$

If the channel matrix $H = \operatorname{diag}(H(1).H(N))$, and if the received data at time t can be written as $$Y(:,t) = HX(:,t) + V(:,t), \quad (3)$$

where the elements of $V(:,t)$ are uncorrelated, then the zero forcing equalizer G can be recovered as $$G = \operatorname{diag}\left(\frac{1}{H(1)}, \ldots, \frac{1}{H(N)}\right). \quad (4)$$

The minimum mean-square error solution also has a diagonal structure:

$$G = \operatorname{diag}\left(\frac{H(1)^*}{|H(1)|^2 + \frac{P_x(1)}{P_v(1)}}, \ldots, \frac{H(N)^*}{|H(N)|^2 + \frac{P_x(N)}{P_v(N)}}\right), \quad (5)$$

where $P_x(k)$ is the power spectral density (PSD) of the input, and $P_v(k)$ is the PSD of the noise on the $k^{th}$ subchannel. These arguments are seen to be the standard one-tap FEQ's such as described by T. Starr, J. Cioffi and P. Silverman, *Understanding Digital Subscriber Line Technology*, Upper Saddle River, N.J.: Prentice Hall, 1999, referenced herein before.

The present inventor recognized, however, when there is correlation in the noise matrix V (e.g., from a correlated noise source such as RFI), it seems reasonable to consider equalizers G that have nonzero elements in addition to the main diagonal. One embodiment can be exemplified by considering the $n^{th}$ subchannel and letting k(n) be the indices of the desired nonzero columns of the $n^{th}$ row of G. Most preferably, G(n, k(n)) can then be found such that $$X(n,t) = Y(k(n),t)^T G(n,k(n))T \quad (6)$$

Letting $g(n) = G(n, k(n))^T$, collecting data from time $t=1, \ldots, T$, and making the obvious substitutions then yields:

$$\begin{bmatrix} X(n,1) \\ \vdots \\ X(n,T) \end{bmatrix} = \begin{bmatrix} Y(k(n),1)^T \\ \vdots \\ Y(k(n),T)^T \end{bmatrix} g(n), \quad (7)$$

where $$x(n) = Y(n)g(n) \quad (8)$$

Therefore, the $n^{th}$ row of the equalizer G can be recovered as $$g(n) = Y(n)^- x(n) \quad (9)$$

This procedure is then repeated for the remaining subchannels to form the complete multichannel FEQ:

$$G = \begin{bmatrix} g(1)^T \\ \vdots \\ g(N)^T \end{bmatrix} \quad (10)$$

The present invention is not so limited however, and it shall be understood that other solutions, including but not limited to, iterative solutions are also possible using least mean-squares (LMS), recursive least-squares (RLS), and their related variants such as discussed by G.-O. Glentis, K. Berberidis and S. Theodoridis, "Efficient least squares adaptive algorithms for FIR transversal filtering," *IEEE Signal Processing Magazine*, vol. 16, no. 4, pp. 13–41, 1999. The $n^{th}$ row, for example, of the multichannel FEQ can be updated as:

$$e(t) = X(n,t) - Y(k(n),t)^T g(n) \quad (11)$$

$$g(n) = g(n) + \mu(t)e(t)Y(k(n),t)^* \quad (12)$$

for $t=1, \ldots, T$, where $\mu(t)$ controls the adaptation. Popular choices include:

Standard LMS:

$$\mu(t) = \alpha \quad (13)$$

where $$0 < \alpha < \frac{2}{\lambda_{\max}(R)} \quad (14)$$

and $$R = E[Y(k(n),t)Y(k(n),t)^H] \quad (15)$$

Normalized LMS (NLMS):

$$\mu(t) = \frac{\alpha}{\beta + Y(k(n), t)^H Y(k(n), t)}, \quad (16)$$

where $\alpha \in (0,2)$ and $0 \leq \beta$.

Power Normalized LMS (PNLMS):

$$\mu(t) = \frac{\alpha}{\sigma^2(t)}, \quad (17)$$

where $$\sigma^2(t) = c\sigma^2(t-1) + |e(t)|^2, c\epsilon(0, 1), \text{ and } 0 < \alpha < \frac{2}{M}.$$

Most preferably, when choosing the nonzero columns of the $n^{th}$ row of G, other than the $n^{th}$ column (which should be selected as this is the column directly correlated with the input through the channel), columns corresponding to subchannels with strong correlations with the $n^{th}$ subchannel should be chosen. These are often neighboring subchannels, or subchannels corresponding to strong RFI sources.

Subchannels with strong RFI can be found via any well-known peak picking algorithm applied to the noise vector V(:, t). It can be appreciated that when RFI dominates the received signal on a subchannel, then adding a weighed version of the received subchannel with RFI to the desired subchannel n is (almost) equivalent to the same operation when no data was transmitted on that subchannel. As the RFI and signal power become closer, however, not transmitting data on a subchannel allows that subchannel to be used more effectively with other subchannels in the multichannel FEQ.

A good model for the RFI (or other source of subchannel noise correlation) could potentially be exploited to improve the performance such as discussed by B. Wiese and J. Bingham, "Digital radio frequency cancellation for DMT VDSL," ANSI T1E1.4/97–460, December 1997. A positive aspect of the present method however, is that its adaptive nature allows it to be somewhat decoupled from the exact RFI model. Further, the single channel FEQ or an existing RFI model could be used to initialize the present adaptive process.

Table 1 below highlights the channel capacity in Mbps for three different scenarios including AWGN with no RFI using a single channel FEQ, AWGN with RFI using a single channel FEQ, and AWGN with RFI using the present multichannel FEQ. The results were obtained by simulating a downstream ADSL channel with RFI added at the receiver. Three subchannels were used for the design of the multichannel FEQ for the $n_{th}$ subchannel: the $n^{th}$ subchannel, and the two other subchannels with the strongest noise power. The multichannel FEQ coefficients were solved for using the NLMS algorithm. The channel was modeled as 6000 feet of 26 AWG twisted pair copper wire with −140 dBm/Hz additive white Gaussian noise (AWGN) and RFI model 1 impairments such as discussed by ITU Telecommunications Standardization Sector, G.test.bis. Study Group 4, Question 15, 2000, referenced herein before. The capacity (C) in bits/s (bps) was calculated from:

$$C = f_0 \log_2(1 + SNR),$$

where $f_0$ is 4000, and SNR is the gap adjusted signal-to-noise ratio after the FEQ.

TABLE 1

| | Capacity calculations | |
|---|---|---|
| Noise | FEQ | Capacity (Mbps) |
| AWGN | Single channel | 10.951 |
| AWGN + RFI | Single channel | 5.794 |
| AWGN + RFI | Multichannel | 7.681 |

FIG. 1 is a graph illustrating a simulated subchannel SNR for 1) additive white Gaussian noise (AWGN) with no RFI using a single channel FEQ, 2) AWGN with RFI using a single channel FEQ, and 3) AWGN with RFI using the present multichannel FEQ in accordance with one embodiment of the present invention. The results suggest that significant SNR improvements (and corresponding capacity gains) are possible with the present multichannel FEQ.

Figure 2:
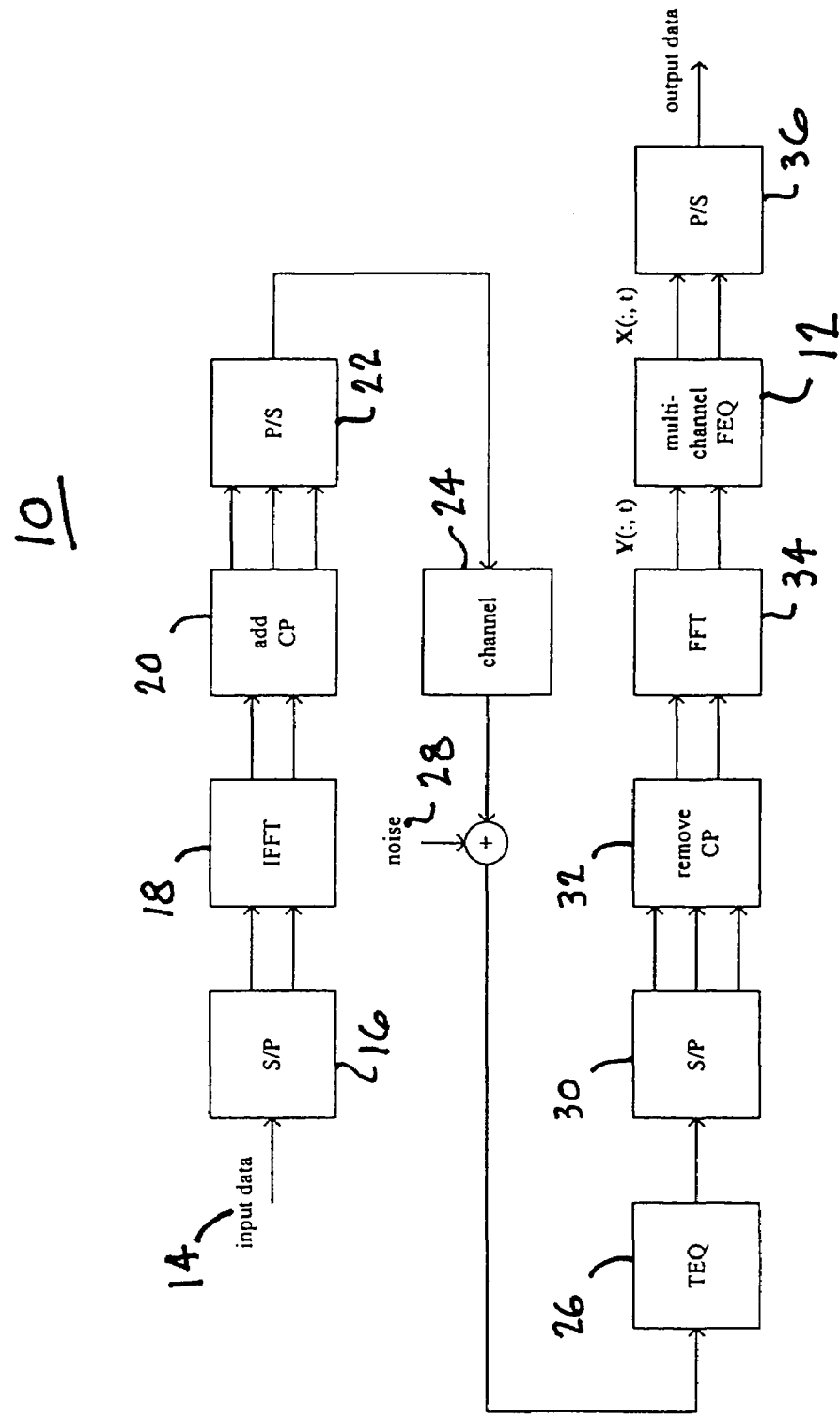
FIG. 2 is a system diagram depicting a multichannel FEQ integrated with an ADSL communication system according to one embodiment of the present invention.

FIG. 2 is a simplified block diagram depicting an ADSL communication system 10 using a multichannel FEQ 12 according to one embodiment of the present invention. At the transmitter, input data 14 to be transmitted is segmented (serial-to-parallel (S/P) converted), as depicted in element 16, into blocks of length N. The $n^{th}$ element is referred to as the $n^{th}$ subchannel. The data is transformed (e.g., in the case of ADSL, by an IFFT as depicted in element 18, and the addition of a cyclic prefix as depicted in element 20) to length N+P. The transformed data is next unsegmented, as depicted by element 22 (parallel-to-serial (P/S) converted). The data is then sent through the channel as shown by element 24 (perhaps after additional filtering, mixing, etc. not shown). This channel data is then received by the ADSL receiver, perhaps after filtering, mixing, etc., and generally includes time domain equalization (TEQ) shown by element 26, that is conventionally implemented as an FIR filter. Noise 28, such as RFI discussed herein before, may be introduced into the signal before it is received by the ADSL receiver. The noise that results from RFI at the receiver is deterministically spread by the FFT to neighboring subchannels. As a result, instead of one (or a few) subchannels being effected by the narrowband impairment, many subchannels are effected. The resulting loss of signal-to-noise ratio (SNR) can unacceptably limit the capacity of the communication channel 24. With continued reference now to FIG. 2, the data is S/P converted as shown by element 30, into blocks of length N+P, subsequent to time domain equalization 26. The data is then transformed (e.g., in the case of ADSL, by removing the cyclic prefix as shown by element 32 and a FFT as shown by element 34) to length N. Following this transformation process, the present multichannel FEQ 12 is applied to each block of data. The multichannel FEQ 12 output data for the $n^{th}$ subchannel can then be expressed as $$x(n,t) = Y(k(n),t)^T g(n).$$

as discussed herein before with reference to equation (7). The output data from the multichannel FEQ 12 is the P/S converted, as shown by element 36, to form an estimate of the original data.

Figure 3:
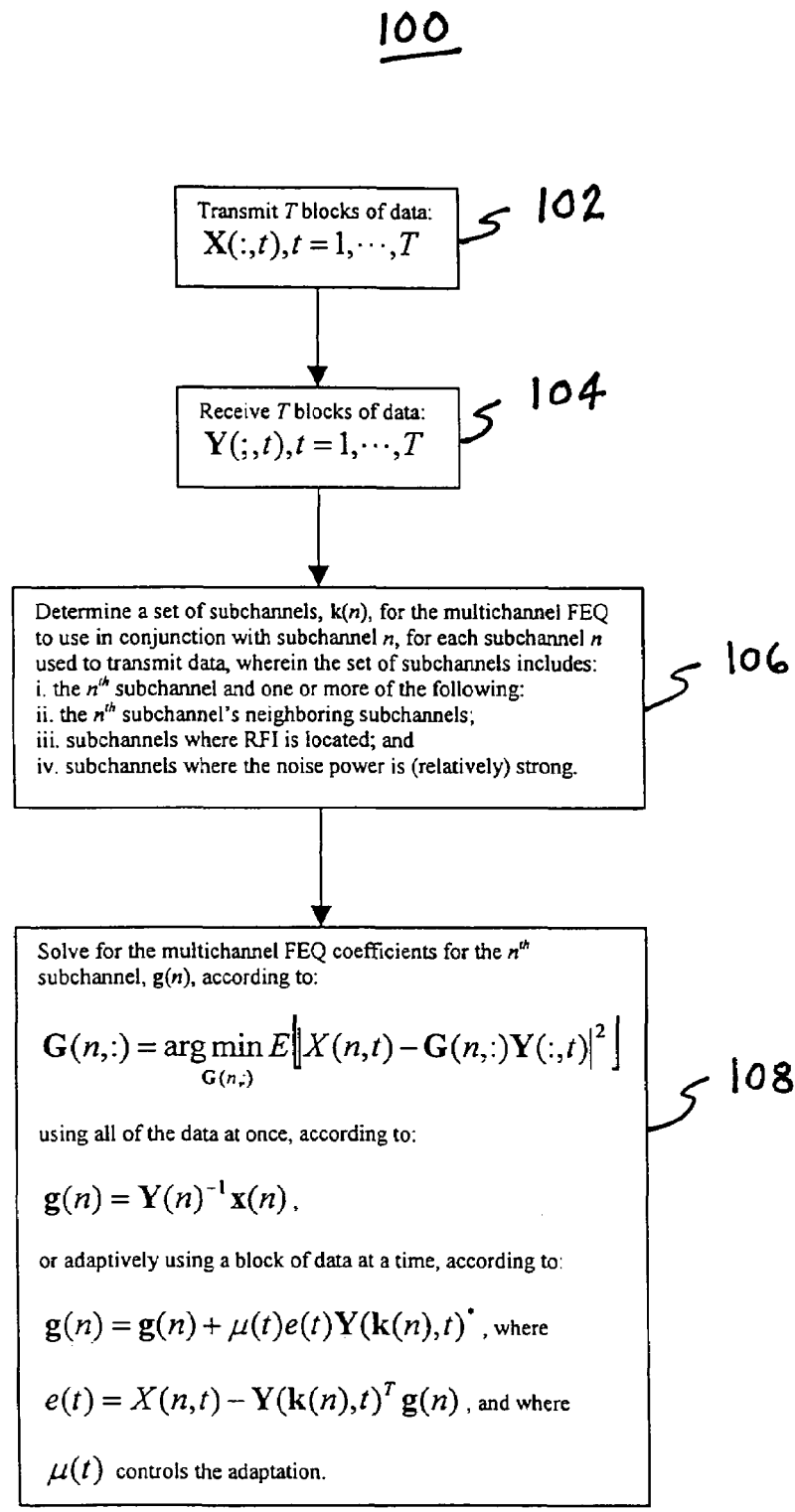
FIG. 3 is a flow diagram illustrating a method of estimating multichannel FEQ coefficients for the $n^{th}$ subchannel, g(n), according to one embodiment of the present invention.

FIG. 3 is a flow diagram illustrating a method 100 of estimating multichannel FEQ coefficients for the $n^{th}$ subchannel, g(n), according to one embodiment of the present invention. As discussed above, the present method relates to T blocks of transmitted data, X(:, t), t=1, . . . , T, and T blocks of received data, Y(:, t), t=1, . . . , T depicted by elements 102 and 104 respectively. The received data can then be used to determine a set of subchannels, k(n), for the multichannel FEQ 12 to use in conjunction with subchannel n, for each subchannel n used to transmit data, as shown by element 106. The set of subchannels, k(n), includes the $n^{th}$ subchannel and one or more of the following: the $n^{th}$ subchannel's neighboring subchannels; subchannels where RFI is located; and subchannels where the noise power is (relatively) strong. Finally, the multichannel FEQ coefficients for the $n^{th}$ subchannel, g(n), are generated as shown by element 108, via equation (2) using all of the received data at once, according to equation (9), or adaptively, using a block of data at a time, according to equations (11) and (12). These multichannel FEQ coefficients are then used in a complex multiply operation to adjust for the gain and phase of the effective channel response in each subsymbol.

In view of the above, it can be seen the present invention presents a significant advancement in the art of communication between subscribers over shared media. Further, this invention has been described in considerable detail in order to provide those skilled in the data communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of canceling communication system noise interference, the method comprising the steps of:
   (a) receiving T blocks of data, Y(:, t), t=1, . . . , T, comprising T blocks of data, X(:,t), t=1, . . . , T, transmitted over predetermined subchannels;
   (b) determining a set of the predetermined subchannels, k(n), to generate coefficients for a multichannel frequency domain equalizer (FEQ) of a subchannel n of the predetermined subchannels;
   (c) generating multichannel FEQ coefficients, g(n), for the subchannel n of the predetermined subchannels used to transmit the received T blocks of data; and
   (d) performing multichannel frequency domain equalization for the subchannel n using the generated multichannel FEQ coefficients;
   wherein the step of determining the set of the predetermined subchannels, k(n), for the subchannel n includes selecting subchannel n;
   wherein the step of determining the set of the predetermined subchannels, k(n), for the subchannel n further includes selecting neighboring subchannels to the subchannel n.

2. The method of canceling communication system noise interference according to claim 1 wherein steps (b)–(d) are repeated for each subchannel n of the predetermined subchannels used to transmit the received T blocks of data.

3. A method of canceling communication system noise interference, the method comprising the steps of:
   (a) receiving T blocks of data, Y(:, t), t=1, . . . , T, comprising T blocks of data, X(:,t), t=1, . . . , T, transmitted over predetermined subchannels;
   (b) determining a set of the predetermined subchannels, k(n), to generate coefficients for a multichannel frequency domain equalizer (FEQ) of a subchannel n of the predetermined subchannels;
   (c) generating multichannel FEQ coefficients, g(n), for the subchannel n of the predetermined subchannels used to transmit the received T blocks of data; and
   (d) performing multichannel frequency domain equalization for the subchannel n using the generated multichannel FEQ coefficients;
   wherein the step of determining the set of the predetermined subchannels, k(n), for the subchannel n includes selecting subchannel n;
   wherein the step of determining the set of the predetermined subchannels, k(n), for the subchannel n further includes selecting subchannels where radio frequency interference is located.

4. A method of canceling communication system noise interference, the method comprising the steps of:
   (a) receiving T blocks of data, Y(:, t), t=1, . . . , T, comprising T blocks of data, X(:,t), t=1, . . . , T, transmitted over predetermined subchannels;
   (b) determining a set of the predetermined subchannels, k(n), to generate coefficients for a multichannel frequency domain equalizer (FEQ) of subchannel n of the predetermined subchannels;
   (c) generating multichannel FEQ coefficients, g(n), for the subchannel n of the predetermined subchannels used to transmit the received T blocks of data; and
   (d) performing multichannel frequency domain equalization for the subchannel n using the generated multichannel FEQ coefficients;
   wherein the step of determining the set of the predetermined subchannels, k(n), for the subchannel n includes selecting subchannel n;
   wherein the step of determining the set of the Predetermined subchannels, k(n), for the subchannel n further includes selecting subchannels having predetermined noise characteristics.

5. A method of canceling communication system noise interference, the method comprising the steps of:
   (a) receiving T blocks of data, Y(:, t), t=1, . . . , T, comprising T blocks of data, X(:,t), t=1, . . . , T, transmitted over predetermined subchannels;
   (b) determining a set of the predetermined subchannels, k(n), to generate coefficient for a multichannel frequency domain equalizer (FEQ) of subchannel n of the predetermined subchannels;
   (c) generating multichannel FEQ coefficients, g(n), for the subchannel n of the predetermined subchannels used to transmit the received T blocks of data; and
   (d) performing multichannel frequency domain equalization for the subchannel n using the generated multichannel FEQ coefficients;
   wherein the step of generating multichannel FEQ coefficients, g(n), for the subchannel n, comprises solving the equation $g(n)=Y(n)^{-1}x(n)$, where $Y(n)^{-1}$ is the pseudo-inverse of a matrix of received data for subchannels k(n), and x(n) is a vector of transmitted data for the subchannel n.

* * * * *